United States Patent
Smith et al.

(10) Patent No.: US 6,609,126 B1
(45) Date of Patent: Aug. 19, 2003

(54) SYSTEM AND METHOD FOR ROUTING DATABASE REQUESTS TO A DATABASE AND A CACHE

(75) Inventors: Erik Richard Smith, Encinitas, CA (US); Paul Alan Conley, Centreville, VA (US)

(73) Assignee: Appfluent Technology, Inc., Arlington, VA (US)

( * ) Notice: Subject to any disclaimer, the term of this patent is extended or adjusted under 35 U.S.C. 154(b) by 0 days.

(21) Appl. No.: 09/711,881

(22) Filed: Nov. 15, 2000

(51) Int. Cl.[7] ................................................ G06F 17/30
(52) U.S. Cl. ............................ 707/8; 707/3; 707/201; 709/219; 709/229
(58) Field of Search ............................ 707/3, 10, 102, 707/8, 201; 709/219, 229

(56) References Cited

U.S. PATENT DOCUMENTS

| | | | |
|---|---|---|---|
| 5,442,771 A | | 8/1995 | Filepp et al. |
| 5,551,046 A | * | 8/1996 | Mohan et al. ............ 707/8 |
| 5,568,181 A | | 10/1996 | Greenwood et al. |
| 5,721,914 A | | 2/1998 | DeVries |
| 5,727,203 A | * | 3/1998 | Hapner et al. ......... 707/103 R |
| 5,737,601 A | | 4/1998 | Jain et al. |
| 5,758,149 A | * | 5/1998 | Bierma et al. ............ 707/8 |
| 5,761,673 A | | 6/1998 | Bookman et al. |
| 5,765,162 A | | 6/1998 | Blackman et al. |
| 5,768,589 A | | 6/1998 | Bradley et al. |
| 5,799,306 A | | 8/1998 | Sun et al. |
| 5,805,804 A | | 9/1998 | Laursen et al. |
| 5,806,075 A | | 9/1998 | Jain et al. |
| 5,806,085 A | | 9/1998 | Berliner |
| 5,829,022 A | | 10/1998 | Watanabe et al. |
| 5,832,521 A | | 11/1998 | Klots et al. |
| 5,870,759 A | | 2/1999 | Bauer et al. |
| 5,870,761 A | | 2/1999 | Demers et al. |
| 5,870,765 A | | 2/1999 | Bauer et al. |
| 5,878,218 A | | 3/1999 | Maddalozzo, Jr. et al. |
| 5,878,220 A | | 3/1999 | Olkin et al. |
| 5,884,325 A | | 3/1999 | Bauer et al. |
| 5,892,945 A | | 4/1999 | Mirchandaney et al. |
| 5,899,986 A | | 5/1999 | Ziauddin |
| 5,920,700 A | | 7/1999 | Gordon et al. |
| 5,926,816 A | | 7/1999 | Bauer et al. |
| 5,933,593 A | | 8/1999 | Arun et al. |

(List continued on next page.)

FOREIGN PATENT DOCUMENTS

| | | |
|---|---|---|
| EP | 1 035 703 A1 | 9/2000 |
| WO | WO 98/34386 A1 | 8/1998 |
| WO | WO 99/23557 A1 | 5/1999 |
| WO | WO 99/23558 A1 | 5/1999 |
| WO | WO 99/23784 A2 | 5/1999 |
| WO | WO 99/41664 A1 | 8/1999 |
| WO | WO 00/45303 A1 | 8/2000 |
| WO | WO 00/63800 A1 | 10/2000 |
| WO | WO 00/65441 A2 | 11/2000 |
| WO | WO 01/08048 A1 | 2/2001 |

*Primary Examiner*—Jean R. Homere
(74) *Attorney, Agent, or Firm*—Cooley Godward LLP

(57) ABSTRACT

A system and method for routing database requests from application logic to a cache and a database, including receiving a database request from the application logic, determining whether the database request is informational or transactional, routing the database request to the cache if the database request is informational, and routing the database request to the database if the database request is transactional. A first example embodiment includes a database which is accessed using a first driver, a cache, and a second driver which determines whether database requests received from application logic are informational or transactional, where informational database requests are routed to the cache and transactional database requests are routed to the database using the first driver.

4 Claims, 15 Drawing Sheets

U.S. PATENT DOCUMENTS

| | | |
|---|---|---|
| 5,937,409 A | 8/1999 | Wetherbee |
| 5,937,414 A | 8/1999 | Souder et al. |
| 5,940,827 A * | 8/1999 | Hapner et al. .................. 707/8 |
| 5,987,233 A | 11/1999 | Humphrey |
| 5,987,463 A | 11/1999 | Draaijer et al. |
| 5,991,768 A | 11/1999 | Sun et al. |
| 6,021,470 A | 2/2000 | Frank et al. |
| 6,026,391 A | 2/2000 | Osborn et al. |
| 6,026,404 A | 2/2000 | Adunuthula et al. |
| 6,029,163 A | 2/2000 | Ziauddin |
| 6,041,344 A | 3/2000 | Bodamer et al. |
| 6,061,504 A | 5/2000 | Tzelnic et al. |
| 6,073,163 A | 6/2000 | Clark et al. |
| 6,078,927 A | 6/2000 | Blackman et al. |
| 6,078,963 A * | 6/2000 | Civanlar et al. ............ 709/238 |
| 6,108,664 A | 8/2000 | Nori et al. |
| 6,108,703 A | 8/2000 | Leighton et al. |
| 6,112,279 A | 8/2000 | Wang |
| 6,112,281 A | 8/2000 | Bamford et al. |
| 6,128,701 A | 10/2000 | Malcolm et al. |
| 6,134,558 A | 10/2000 | Hong et al. |
| 6,138,162 A | 10/2000 | Pistriotto et al. |
| 6,148,337 A * | 11/2000 | Estberg et al. ............... 709/224 |
| 6,182,111 B1 | 1/2001 | Inohara et al. |
| 6,182,122 B1 | 1/2001 | Berstis |
| 6,185,572 B1 | 2/2001 | Blackman et al. |
| 6,192,398 B1 | 2/2001 | Hunt |

* cited by examiner

408

SYSTEM AND METHOD FOR ROUTING DATABASE REQUESTS TO A DATABASE AND A CACHE

BACKGROUND

1. Field of the Invention

The present invention relates generally to computer databases and more particularly to a system and method for routing database requests from application logic to a cache and a database.

2. Discussion of the Related Art

Many computer applications today utilize a database to store, retrieve, and manipulate information. Simply put, a database refers to a collection of information organized in such a way that a computer program can quickly select desired pieces of data. For example, an individual might use a database to store contact information from their rolodex, such as names, addresses, and phone numbers, whereas a business entity might store information tracking inventory or customer orders.

Databases include the hardware that physically stores the data, and the software that utilizes the hardware's file system to store the data and provide a standardized method for retrieving or changing the data. A database management system (DBMS) provides access to information in a database. This is a collection of programs that enables a user to enter, organize, and select data in a database. The DBMS accepts requests for data (referred to herein as database requests) from an application program and instructs the operating system to transfer the appropriate data. Database requests can include, for example, read-only requests for database information (referred to herein as informational database requests) and requests to modify database information (referred to herein as transactional database requests). With respect to hardware, database machines are often specially designed computers that store the actual databases and run the DBMS and related software.

FIG. 3A depicts a conventional database configuration 300A, wherein a computer application 102 accesses information stored in a database 104 having a DBMS 120. Application 102 includes application logic 110 and a database driver 114. Application 102 and database 104 interact in a client/server relationship, where application 102 is the client and database 104 is the server. Application logic 110 establishes a connection 310 to DBMS 120 using database driver 114. Database driver 114 provides an Application Programming Interface (API) that allows application logic 110 to communicate with database 104 using function calls included in the API. Conventional database drivers 114 typically handle communication between a client (e.g., application logic 110) and a single database server, or possibly between multiple servers of the same basic type. Many conventional database drivers 114 make use of a proprietary client/server communication protocol (shown as line 310 in FIG. 3A).

The performance of the conventional client/server database design depicted in FIG. 3A can be improved with the addition of a cache. FIG. 3B depicts a second conventional database configuration 300B wherein a cache 106 is inserted between application 102 and database 104. This configuration is referred to herein as an inline cache. Application logic 110 uses a cache driver 302 to establish a connection with cache 106. Cache 106 provides rapid access to a subset of the database information stored in database 104, as will be apparent to those skilled in the art. Cache 106 establishes a connection 314 with DBMS 120 using database driver 114, where the driver can be integrated within the cache.

All database requests from application logic 110 are routed first to cache 106. Cache 106 may handle requests differently depending on the type of operation requested and whether the target data is stored in cache 106. For example, informational database requests can be handled by cache 106 without going to database 104, so long as the information that is the target of the request (i.e., the target data) in stored in cache 106. Since the response time of cache 106 is significantly faster than that of database 104, performance is increased as the percentage of information database requests grows in relation to the total number of database requests.

Transactional database requests are performed in both cache 106 and database 104. Consistency between cache 106 and database 104 is maintained because transactional requests are performed on the database information stored in both locations. As a result, application logic 110 can only utilize those transactional requests that are understood by both cache 106 and database 104 for consistency to be maintained. For example, if application logic 110 issued a transactional request that was understood by database 104 but not by cache 106, the information would be changed in database 104 but not in cache 106, and the two would no longer be consistent. Therefore, only those requests for which database 104 and cache 106 share a common vocabulary are supported in this configuration.

Many database manufacturers provide for the execution of stored procedures within database 104 which can increase flexibility and performance. The implementation of these database-side capabilities may be proprietary to the database manufacturer. Third party manufacturers of inline caches may not have access to this proprietary information, and may therefore be unable to implement corresponding capabilities within the cache. As a result, consistency cannot be maintained between cache 106 and database 104 in inline cache configuration 300B if application logic 110 is allowed to utilize these database-side capabilities. This limitation forces software vendors to re-code their applications 102, eliminating any calls to database-side capabilities in favor of those operations within the vocabulary common to both cache and database.

Also, while the addition of the inline cache results in some performance improvement for the processing of informational requests, performance can degrade for the processing of transactional requests. The client generating the request must wait until the inline cache commits the changes to both the cache and the database. Adding the inline cache can therefore increase the amount of time the client must wait when processing transactional requests as compared to a database configuration without a cache (300A). Further, the requirement that the inline cache be inserted between the client and server and receive all database requests limits the flexibility of the inline configuration. For example, some application logic 110 cannot easily be modified to allow for the insertion of the inline cache.

Finally, the fault tolerance of the inline cache configuration depends upon the fault tolerance of the inline cache. Failure of the inline cache will result in database 104 being cut off from its clients, since all client request must pass through the failed cache 106.

What is needed is an improved system and method for routing database requests from application logic to a cache and a database that is both flexible and fault-tolerant, wherein transactional requests are handled efficiently and the application logic is able to take advantage of proprietary database mechanisms and/or database-side execution capabilities.

SUMMARY OF THE INVENTION

The present invention provides a system and method for routing database requests from application logic to a cache and a database, including receiving a database request from the application logic, determining whether the request is informational or transactional, routing the request to the cache if the database request is informational, and routing the request to the database if the request is transactional.

A first example embodiment of the present invention includes a database which is accessed using a first driver, a cache, and a second driver which determines whether database requests received from application logic are informational or transactional, where informational requests are routed to the cache and transactional requests are routed to the database using the first driver.

An advantage of the present invention is that transactional requests are routed to the database without passing through the cache, thereby enabling the application logic to utilize whatever proprietary database mechanisms and/or database-side execution capabilities are provided the database. Routing transactional requests to the database without passing through the cache also decreases the amount of time the client must remain locked pending completion of the transactional request.

Another advantage of the present invention is that informational requests are routed to, and handled by, the cache. As a result, those informational requests that can be handled by the cache need never be forwarded on to the database. The database, freed of the responsibility of handling these informational requests, may more efficiently handle those other requests that are routed to the database.

Another advantage of the present invention is that the fault-tolerance of the system does not depend upon the fault-tolerance of the cache. If the cache fails, all requests may be routed directly to the database until the cache is again operational. In other words, according to the present invention, the cache is not a system point of failure.

The present invention provides for the efficient processing of database requests, particularly where the requesting application issues informational requests in disproportion to the number of transactional requests. For example, applications which maintain a web site receive many more request for data than requests to change data. As a result, these applications will issue many more informational requests (that are not sensitive to cache consistency) than transactional requests to a backend database. The present invention is particularly well suited to processing database requests in this type of environment.

These and other features and advantages of the present invention will become apparent from the following drawings and description.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention provides a system and method for routing database requests from application logic to a cache and a database. Generally speaking, according to the present invention database requests are selectively routed to a cache and/or a database depending upon whether the request is determined to be appropriate for cache processing. Various embodiments of the present invention are described below.

Overview

Figure 1:
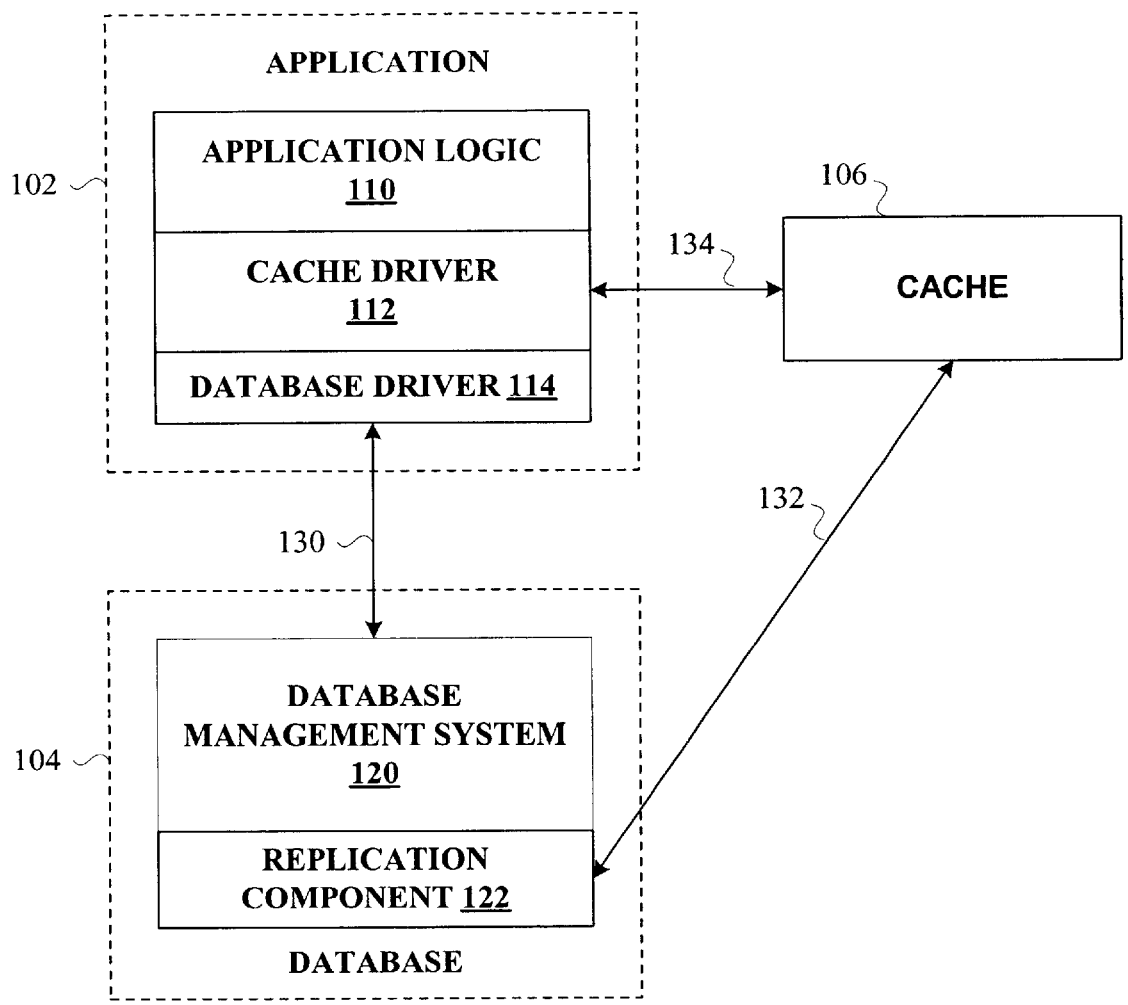
FIG. 1 depicts a cache configuration according to an example embodiment of the present invention.

FIG. 1 depicts a cache configuration 100 according to an example embodiment of the present invention. Application 102 includes application logic 110, an improved cache driver 112, and database driver 114. Database 104 includes DBMS 120 and a replication component 122. Application logic 110 establishes a connection 134 with cache 106 by calling cache driver 112. Cache driver 112 calls database driver 114 to establish a connection 130 with DBMS 120. Replication component 122 communicates with cache 106 via connection 132.

Database 104 represents computer software that utilizes the database hardware's file system to store database information and provide a standardized method for retrieving or changing the data. As described above, DBMS 120 represents a collection of programs that enables a client to enter, organize, and select database information. DBMS 120, in response to a database request, instructs the operating system (not shown) to perform the desired operation(s) on the appropriate data. According to an example embodiment of the present invention, database 104 (and cache 106) store database information as relational data, based on the well known principles of Relational Database Theory wherein data is stored in the form of related tables. Many database products in use today work with relational data, such as products from INGRES, Oracle, Sybase, and Microsoft. Other alternative embodiments can employ different data models, such as object or object relational data models.

As described above with respect to inline cache configuration 300B, cache 106 provides rapid access to a subset of the database information stored in database 104. Cache 106 processes database requests from a connection established by a client and returns database information corresponding to the database request (target data). The faster response time of cache 106 provides an increase in performance for those database requests that can be handled by the cache. According to an example embodiment of the present invention, cache 106 represents a high performance computer application running on a dedicated machine. The cache's primary architecture is preferably based on a main memory database (MMDB). An MMDB provides the ability to process database requests orders of magnitude faster than traditional disk based systems. As will be apparent, other cache architectures may be used. Further, cache 106 may also include a secondary disk based cache (not shown) to handle database requests that are too large to fit in main memory.

Application 102 can represent any computer application that accesses database 104, such as a contact manager, order tracking software, or any application executing on an application server connected to the Internet. Application logic 110 represents the portion of application 102 devoted to implementing the application functionality. For example, application logic 110 can include a graphical user interface (GUI) to control user interactions with application 102, various processing routines for computing items of interest, and other routines for accessing and manipulating database information stored in database 104.

Database driver 114 represents software that allows application logic 110 to establish a connection (as a client) to DBMS 120. As described above, database driver 114 provides an API that can include a variety of other function calls for interacting with DBMS 120. According to an example embodiment of the present invention, database driver 114 represents the driver software that is distributed by the manufacturer of database 104. As a result, connection 130 represents a connection established according to the manufacturer's proprietary client/server communication protocol.

According to an example embodiment of the present invention, database driver 114 and cache driver 112 support the Open Database Connectivity (ODBC) and Java Database Connectivity (JDBC) standards. Generally speaking, clients using these types of drivers can generate SQL query requests for the server to process. In another example embodiment, cache 106 also supports the ability to respond to Extensible Markup Language Query Language (XQL) queries which do not specify a particular driver type (driverless) and use an open standard mechanism, such as Hypertext Transfer Protocol (HTTP), for its communication protocol.

Replication component 122 detects changes that occur in database information stored within database 104, and insures that these changes propagate to cache 106. The operation of replication component 122 according to the present invention is described in greater detail below.

Cache driver 112 causes database requests from application logic 110 to be routed to DBMS 120 and/or cache 106. Cache driver 112 provides an API that can include a variety of function calls for use by application logic 110. According to an example embodiment of the present invention, the cache driver API can include one or more of the function calls defined in the database driver API.

Figure 2A:
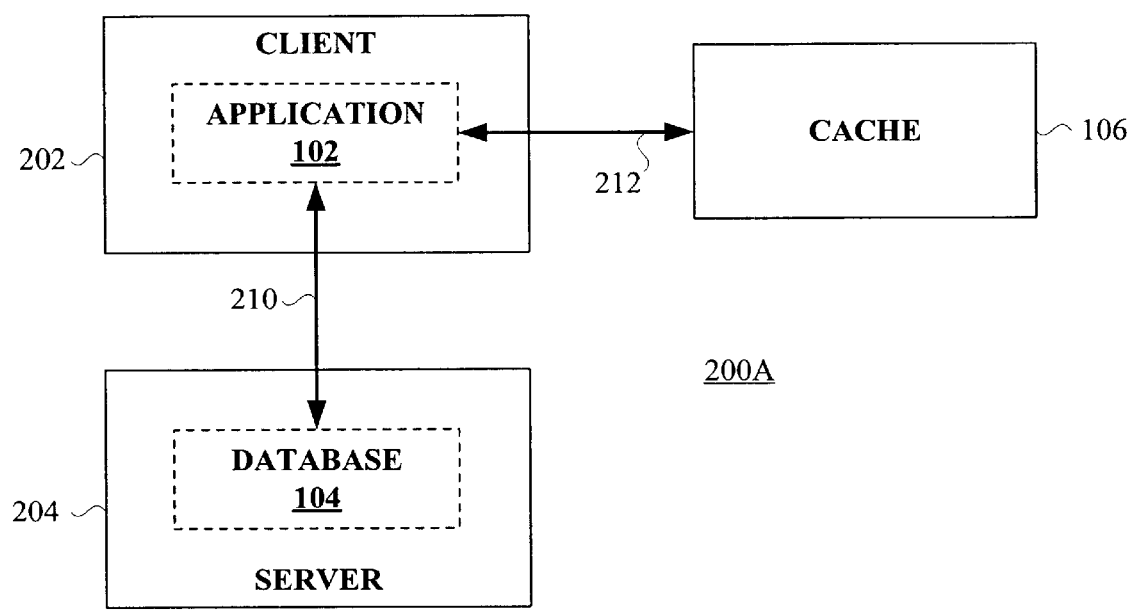
FIG. 2A depicts a first example hardware configuration, wherein an application runs on a client computer in communication with a database running on a server computer.
Figure 2B:
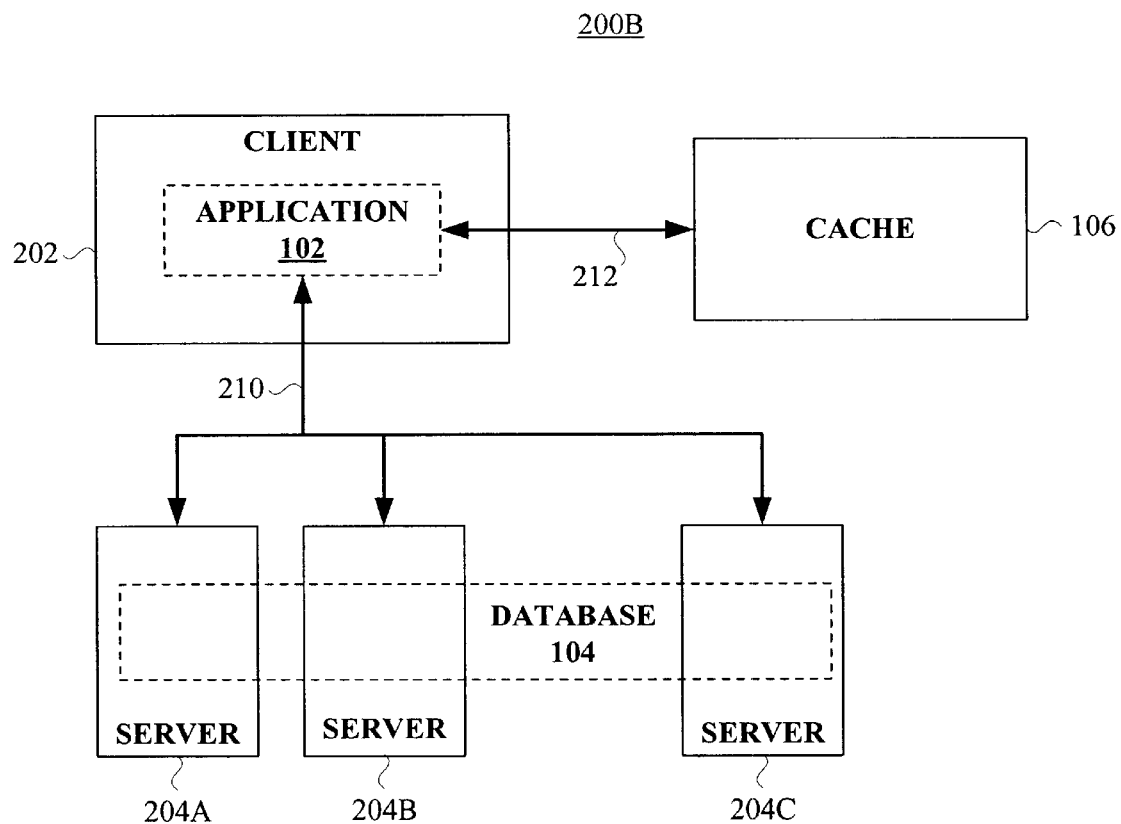
FIG. 2B depicts a second example hardware configuration, wherein a database utilizes multiple servers.
Figure 2C:
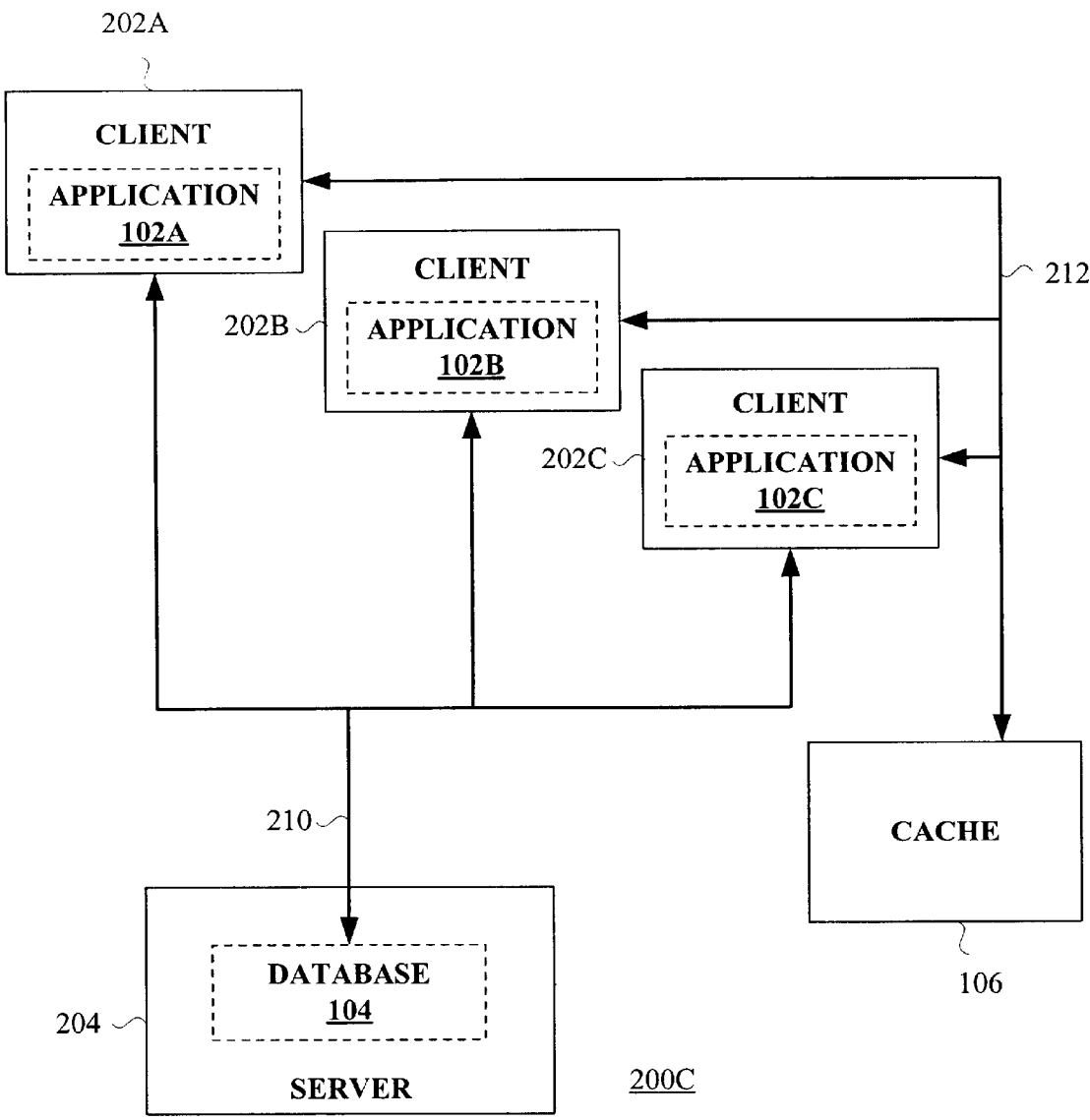
FIG. 2C depicts a third example hardware configuration, wherein multiple applications operate on one or more client computers to access a database.

FIG. 2A depicts a first example hardware configuration 200A, wherein application 102 runs on a client computer 202, in communication with database 104 running on a server computer 204 (via a communication link 210), and in communication with cache 106 (via a communication link 212). FIG. 2B depicts a second example hardware configuration 200B, wherein database 104 utilizes multiple servers 204 (shown as 204A through 204C). That multiple servers 204 are being used can be transparent to the client application whose communications with DBMS 120 remain the same regardless of the backend server configuration. FIG. 2C depicts a third example hardware configuration 200C, wherein multiple applications 102 (shown as 102A through 102C) operate on one or more client computers 202 (shown as 202A through 202C) to access database 104. As will be apparent from the principles described herein, many other hardware configurations, including various combinations of the example hardware configurations described above, are contemplated within the scope of the present invention.

Figure 2D:
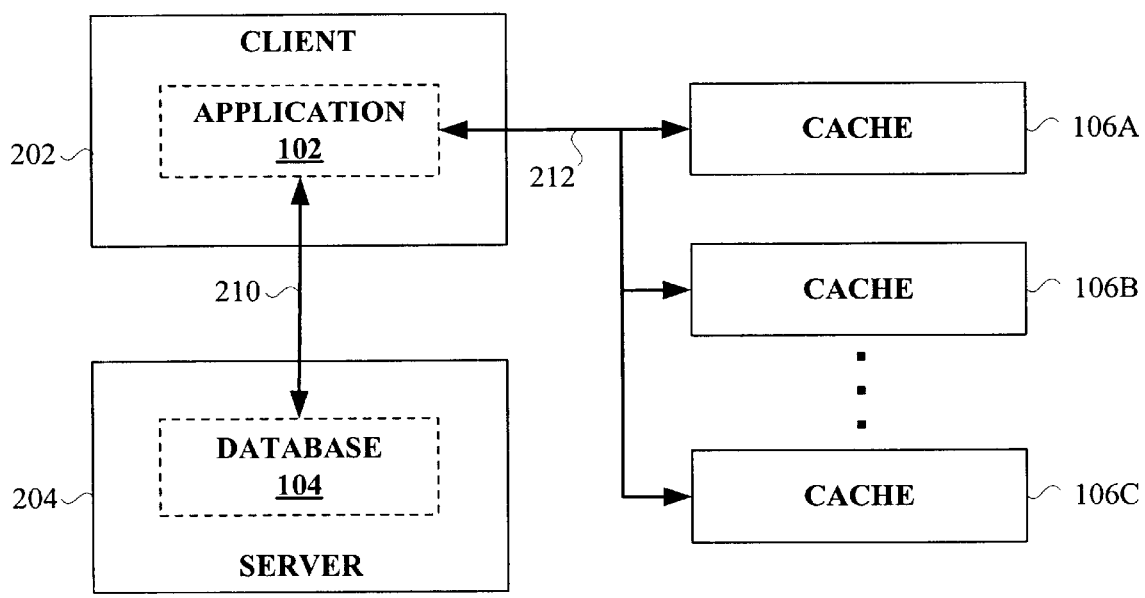
FIG. 2D depicts a fourth example hardware configuration employing two or more caches.
Figure 3A:
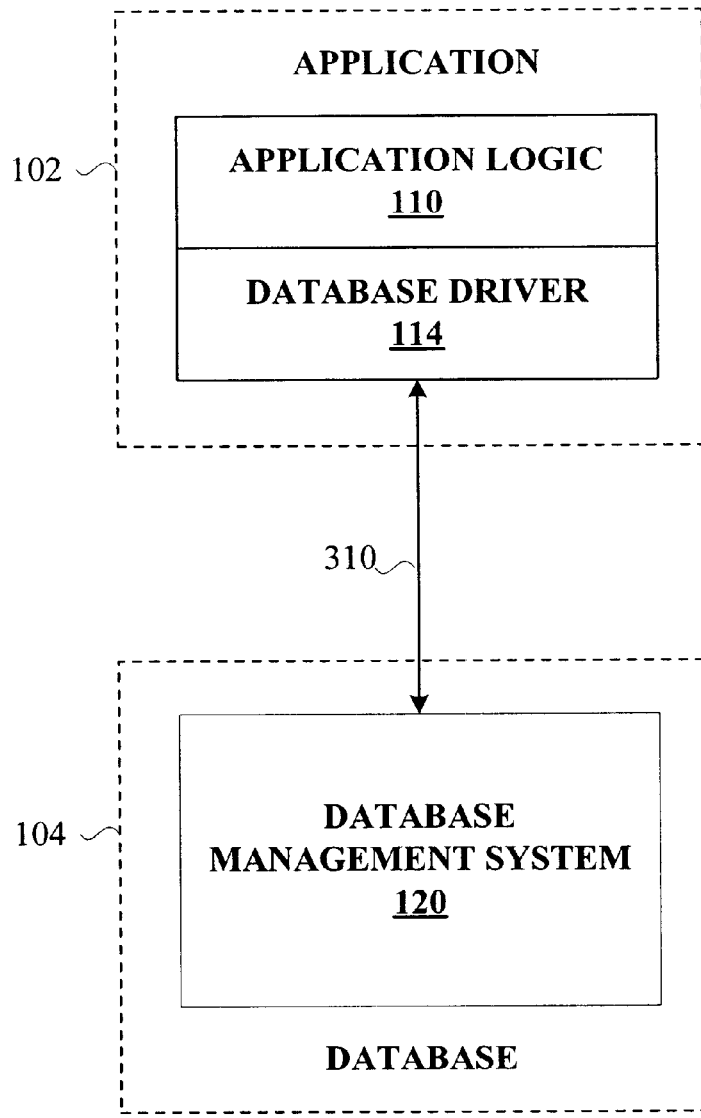
FIG. 3A depicts a conventional database configuration, wherein a computer application accesses information stored in a database having a database management system.
Figure 3B:
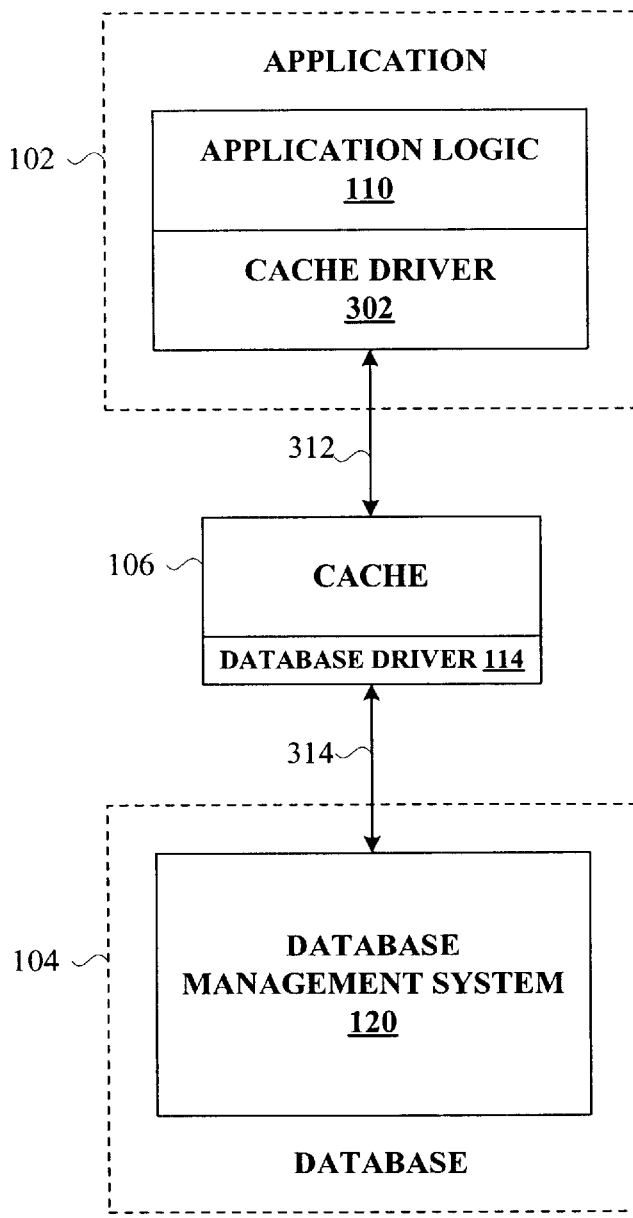
FIG. 3B depicts an inline cache configuration.

FIG. 2D depicts a fourth example hardware configuration 200D employing two or more caches 106 (shown as 106A through 106C). According to the present invention, load balancing techniques may be used with multiple cache configuration 200D. Database requests from application 102 may be directed at the cluster of caches in round-robin fashion, thereby distributing the processing burdens across multiple caches. Alternatively, the database information that would have been stored in a single cache may be partitioned and stored across a cluster of caches. This allows for the storage of larger tables than would otherwise be possible using a single cache.

Communication links 210 and 212 can represent any connection over which the information described herein can be transmitted. For example, communication links 210 and 212 can represent a cable connection, a local area network (LAN), a wide area network (WAN), the Internet, a satellite communications network, a wireless network, or any combination of the above.

According to an example embodiment of the present invention, application logic 110 calls cache driver 112 to establish a connection (as a client) to cache 106. Those database requests routed to cache 106 may be passed via this connection. With respect to database requests routed to database 104, cache driver 112 calls database driver 114 to establish a connection with DBMS 120, and then uses the function calls provided by the database driver API. The operation of cache driver 112 is described in greater detail below.

General Operation

The present invention includes one or more computer programs which embody the functions described herein and illustrated in the appended flowcharts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flowcharts and associated written description included herein. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Figure 4:
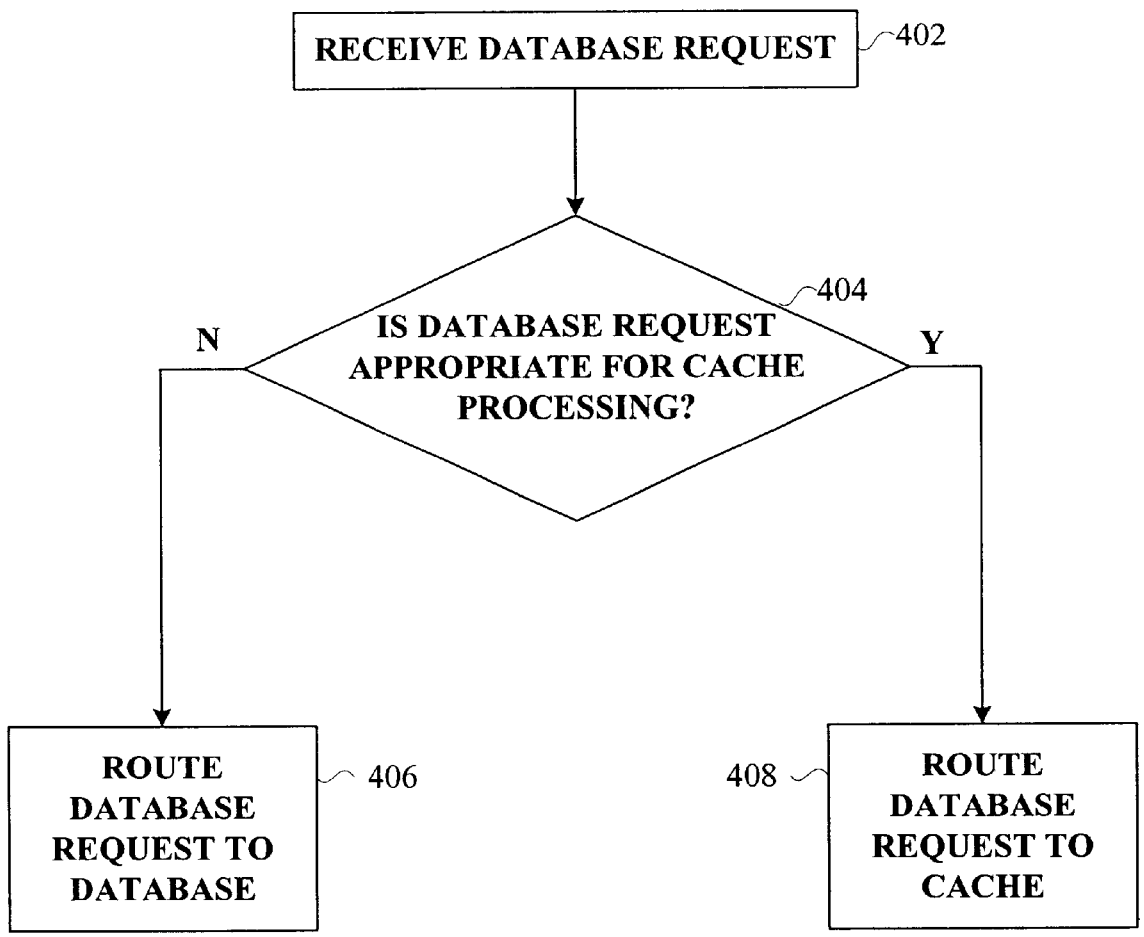
FIG. 4 is a flowchart that describes a method for routing database requests according to the present invention.

FIG. 4 is a flowchart 400 that describes a method for routing database requests according to the present invention. The operations depicted in flowchart 400 are described with respect to cache configuration 100 depicted in FIG. 1. However, as will be apparent, the methods described herein are not necessarily limited to operations performed by cache configuration 100. Rather, the methods described herein may be accomplished by any database configuration capable of performing the described operations.

In operation 402, a database request is received from application logic 110. The form of the database request can vary, depending upon the particular database language used. For example, SQL queries are typically in the form of a text string. In cache configuration 100, application logic 110 passes the database request to cache driver 112.

In operation 404, the database request is analyzed to determine whether or not the request is appropriate for processing by cache 106. According to an example embodiment of the present invention, those database requests determined to be informational are considered appropriate for cache processing, whereas transactional requests are considered inappropriate for cache processing. As described in greater detail below, other factors may also be considered when making this determination, such as whether the target data is stored within cache 106 (if not, then even informational requests are not appropriate for cache processing). In cache configuration 100, cache driver 112 preferably makes the determination described in operation 404, i.e., cache driver 112 includes a routine for analyzing the database request and making the determination based on some established criteria.

In operation 406, those requests determined not to be appropriate for cache processing are routed from application 102 to database 104 for processing. Database 104 may then process the request, possibly resulting in database information being stored, retrieved, and/or manipulated according to the request.

According to the example embodiment of cache configuration 100, cache driver 112 accomplishes this by calling database driver 114 to establish a connection with DBMS 120, and then transferring the request to database 104 for processing. Cache driver 112 therefore makes use of database driver 114 as a "slave" driver in the sense that the two operate in a master/slave relationship. Using a slave driver in this way avoids the need to re-implement within cache driver 112 the specifics of communicating with databases produced by different manufacturers. This is particularly important where cache 106 and database 104 are produced by different manufacturers, and where the manufacturer of cache 106 desires to produce a product that supports databases from multiple manufacturers.

In operation 408, those requests determined to be appropriate for cache processing are routed from application 102 to cache 106 for processing. Cache 106 may then process the request in much the same manner as database 104. In cache configuration 100, cache driver 112 accomplishes this by establishing a connection to cache 106 and transferring the request so that it may be processed by the cache.

Since transactional requests are routed to database 104 and bypass cache 106, there are no vocabulary restrictions on application logic 110. In other words, there is no requirement that cache 106 duplicate the functionality of database 104 (as with the inline cache configuration) because transactional requests are not routed to cache 106. Application logic 110 may therefore take full advantage of any database-side execution capabilities of database 104. As described below, replication component 122 ensures that changes made to database 104 are replicated in cache 106.

FIGS. 1 and 4 are now described in greater detail according to various alternative embodiments of the present invention.

Operation of Cache Driver

Figure 5:
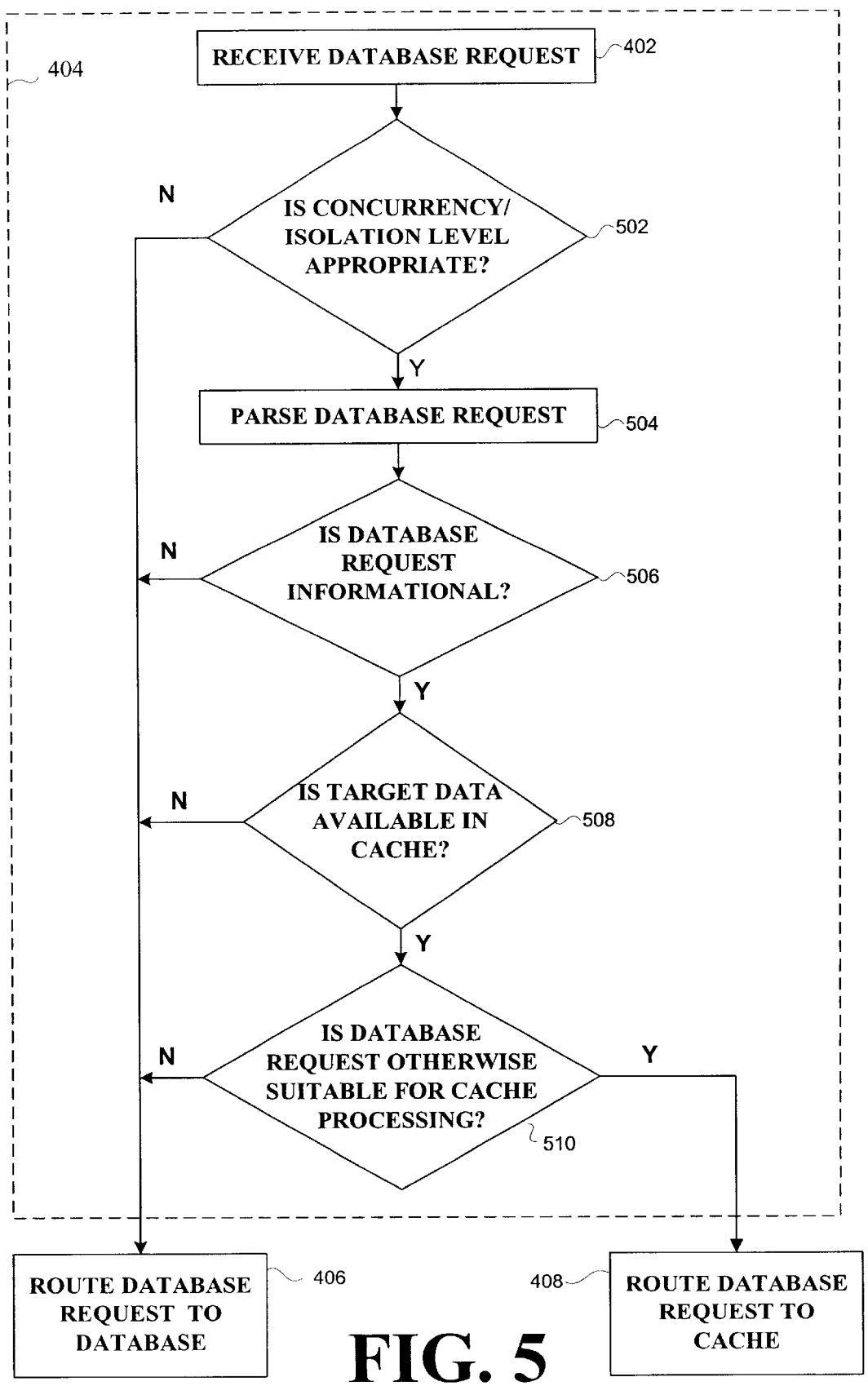
FIG. 5 is a flowchart that describes determining whether a database request is appropriate for cache processing in greater detail according to an example embodiment of the present invention.

FIG. 5 is a flowchart that describes operation 404 in greater detail according to an example embodiment of the present invention. The determination of whether a request is appropriate for cache processing depends upon whether the request is determined to be informational or transactional. As described below, additional factors may also be considered when determining the appropriateness of cache processing.

The operations described in FIG. 5 with respect to operation 404 are preferably performed by cache driver 112 in cache configuration 100. Cache driver 112 therefore preferably includes the functions necessary to perform operation 404. However, as will be apparent, other alternative embodiments are contemplated wherein the functions associated with operation 404 may be performed by other components of application 102. For example, one or more of these functions might alternatively be performed by application logic 110 rather than cache driver 112, with only minor modifications.

As will be apparent, one or more of the operations depicted in FIG. 5 may be performed in an order different than the order depicted. For example, the order of operations 502 and 504 may be switched with only minor modifications. Also, one or more of the operations depicted in FIG. 5 may be omitted entirely, or other operations added that reflect different criteria used in the determination of the appropriateness of cache processing.

The operations of FIG. 5 will be described with respect to an example SQL database request. The example SQL database request (received from application logic 110 in operation 402) is a text specified query described as:

SELECT expr1[,expr2, . . . ]

FROM table1,[table2, . . . ]

[WHERE condition]

The SELECT clause indicates expressions that will define each column in a table of results. The expressions may indicate fields that belong to one of the tables listed in the FROM clause. Field names might additionally be prefixed with a table name and a dot to resolve ambiguity between fields in different tables with the same name.

The FROM clause specifies which tables are to be involved in the request.

The WHERE clause specifies conditions and constraints that apply when performing the request. One type of constraint is called a "join condition." A join condition specifies how records in one table are related to records in another. This is typically specified as follows:

WHERE table1.id=table2.id

A join condition between two tables may specify either a one-to-one mapping of records or a one-to-many relationship, depending on the nature and content of the two tables. The WHERE clause also serves to specify conditions for records in a table. A condition may also restrict the records returned for a given table to only those records which meet the condition. An example might be:

WHERE age>18

Multiple instances of both types of conditions can be combined in a WHERE clause using the logical operators AND and OR. WHERE clauses may also incorporate a set of relational operators (=,<,>,<>) and special functions (LIKE, UPPER) defined in conventional SQL specifications.

Referring now to FIG. 5, in operation 502 an isolation level and/or a concurrency setting associated with the database request is analyzed to determine whether the request is appropriate for cache processing. Certain driver environments allow a transaction isolation level to be associated with the database request. According to an example embodiment of the present invention, the isolation level is compared to a first threshold. Only those database requests having an isolation level less than or equal to the first threshold are determined to be appropriate for cache processing. Those database requests having an isolation level greater than the first threshold are determined to be inappropriate for cache processing and, as shown in FIG. 5, in operation 406 the request is routed to database 104.

Other driver environments may allow a related setting called the concurrency setting. This setting is roughly the inverse of the transaction isolation level. The concurrency setting is compared to a second threshold, wherein those requests that meet or exceed the second threshold are considered appropriate for caching. Still other driver embodiments, such as ODBC, provide for both an isolation level and a concurrency setting. Alternative embodiments of the present invention are contemplated wherein neither of these measures is considered, either one is considered, or both are considered when determining the appropriateness of cache processing.

In operation 504, the database request is parsed to extract information that is used to determine the appropriateness of cache processing. According to an example embodiment of the present invention, an SQL database request is parsed, for example, by scanning characters in the SQL text string and performing well known techniques for lexical and semantic analysis. The information extracted as a result of the SQL parsing process can be used for further analysis and for execution of the request. This information is preferably assembled into a data structure that includes basic information such as the tables and fields that are being requested (i.e., the target data). Any expressional elements of the request, such as field expressions and the WHERE condition expression, are preferably stored in the data structure as trees, as will be apparent. An expression tree is an easy data structure to access, navigate and manipulate in subsequent operations.

Figure 6:
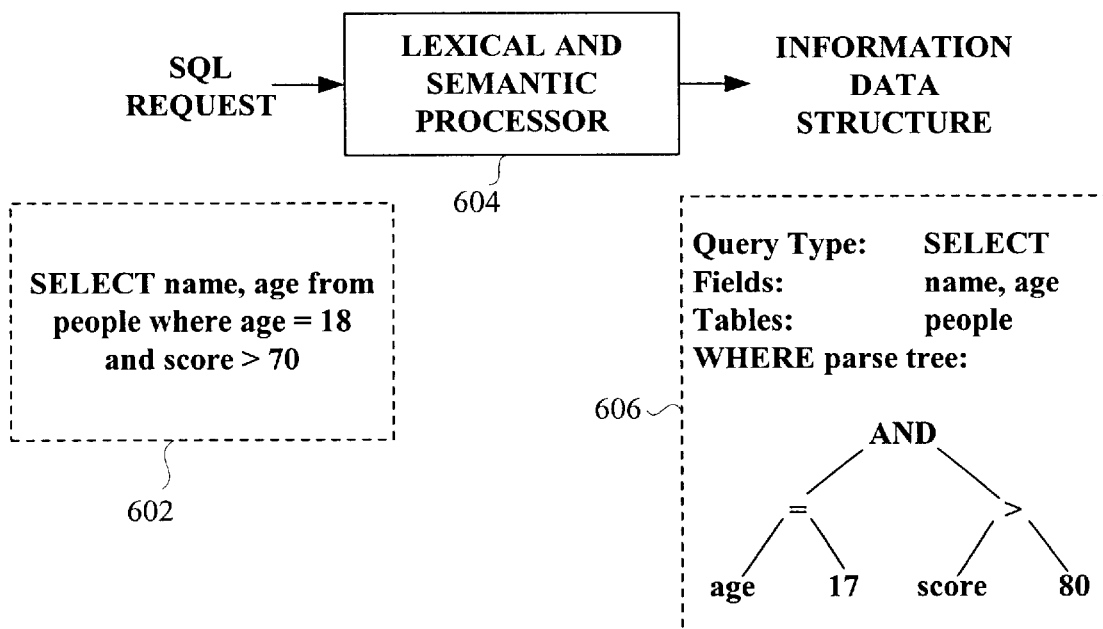
FIG. 6 depicts an example database request being subject to lexical and semantic analysis.

FIG. 6 depicts the example database request 602 described above being subject to lexical and semantic analysis 604. The resulting data structure 606 includes several items (Query Type, Fields, Tables) and a WHERE expression tree. If the request is not a SELECT request, then a data structure will preferably be generated with a Query Type field not equal to type SELECT.

In operation 506, the information parsed from the database request is analyzed to determine whether the database request is informational. As described above, informational requests are read-only queries for database information. In the example SQL embodiment, SELECT requests (or variants thereof) are determined to be informational (as shown above in the example SQL request). Other types of SQL requests are determined to be transactional. As shown in FIG. 5, those requests that are determined not to be informational are routed to database 104 in operation 406.

In operation 508, a determination is made whether the request's target data is stored in cache 106. If the target data is not available in cache 106, then in operation 406 the request is routed to database 104 for processing. According to an example embodiment of the present invention, the target data is compared against a cache content data structure that provides information about what database information is stored in the cache, preferably at the table level, since the last time the cache was checked.

Figure 7:
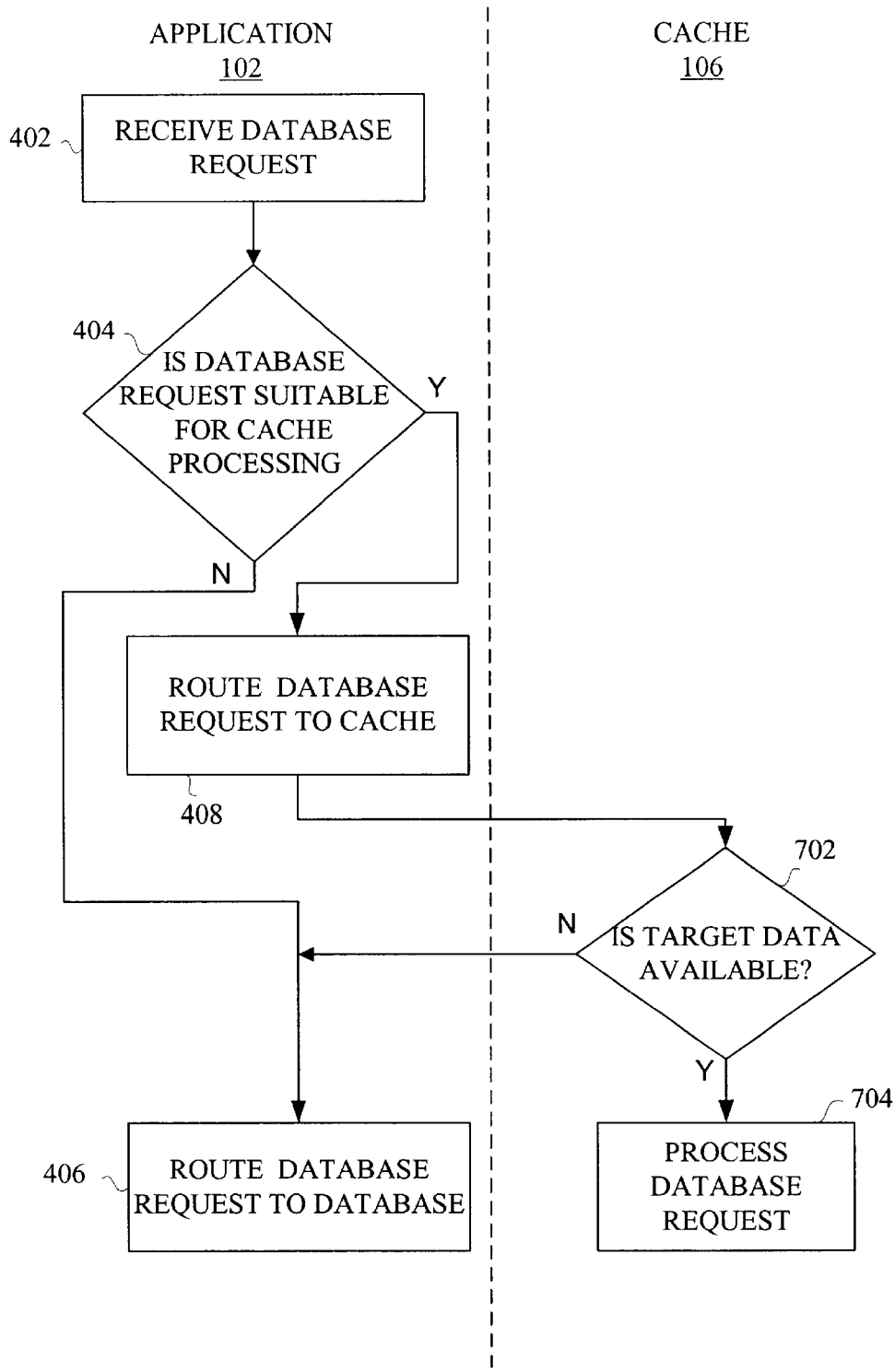
FIG. 7 is a flowchart that describes an alternative example embodiment of the present directed to routing database requests to a remote cache.

FIG. 7 is a flowchart 700 that describes an alternative example embodiment of the present directed to routing database requests to a cache 106 that is accessible via a network, referred to herein as a remote cache. Flowchart 700 identifies those operations that are performed by application 102 and those operations that are performed by cache 106. As described above, operation 404 preferably includes determining whether the target data is stored in cache 106 (operation 508). However, this operation is predictive in nature whenever cache 106 is remote because there is a delay between when the cache content changes and when the cache content data structure is updated to reflect the changes. Typically, routing errors resulting from this latency are not significant because of the relatively low frequency of changes in the cache content.

As depicted in FIG. 7, requests deemed appropriate for cache processing are sent to the remote cache in operation 408. In operation 702, a second check is done at the remote cache to ensure that the target data is actually available. This is an authoritative check because it is done locally within cache 106, obviating the latency issue encountered with a remote check. If the target data is available, the database request is processed by cache 106 in operation 704. If the target data is not available, the database request is sent back to application logic 110 and rerouted to database 106 in operation 406.

Returning now to FIG. 5, in operation 510 the information parsed from the database request is analyzed to determine whether the database request is otherwise suitable for cache processing. The criteria analyzed in this operation may vary according to the driver type and database language used. In the example SQL embodiment, the parsed data structure is checked to see if all SQL features are supported by cache 106. The general complexity of the request is also preferably checked for cache support. Cache 106 may also decline the request if it is determined that cache 106 cannot handle the request efficiently.

Routing Database Requests

Returning again to FIG. 4, once it is determined in operation 404 whether the database request is appropriate for cache processing, those requests deemed inappropriate are routed to database 104 in operation 406. Otherwise, those requests deemed appropriate for cache processing are routed to cache 106 in operation 408.

Figure 8:
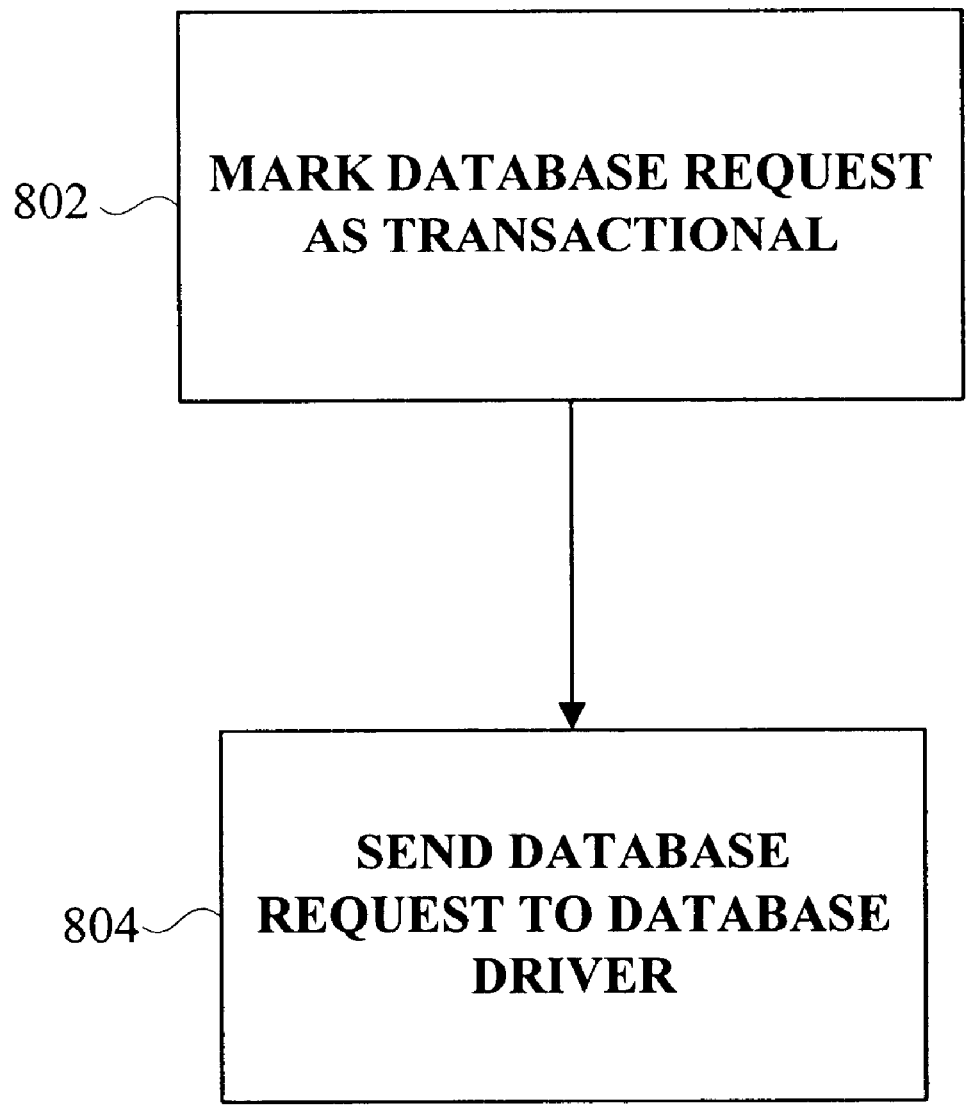
FIG. 8 is a flowchart that describes routing a database request to a database in greater detail according to an example embodiment of the present invention.

FIG. 8 is a flowchart that describes operation 406 in greater detail according to an example embodiment of the present invention. As described above, transactional requests are preferably routed to database 104 for processing (as determined in operation 404). In operation 802, the database request is marked as transactional so that the request may be more easily routed through subsequent operations.

In operation 804, cache driver 112 sends the database request to database driver 114 for processing by database 104. Cache driver 112 preferably calls database driver 114, as described above, according to a master/slave relationship. Cache driver 112 is thereby able to establish a connection with database 104, and to employ those functions defined with the database driver API for communicating with database 104. Any remaining request processing duties (if any) are passed on to database driver 114. Subsequent communications related to the submitted request from application logic 110 are redirected to database driver 114 for handling.

Figure 9:
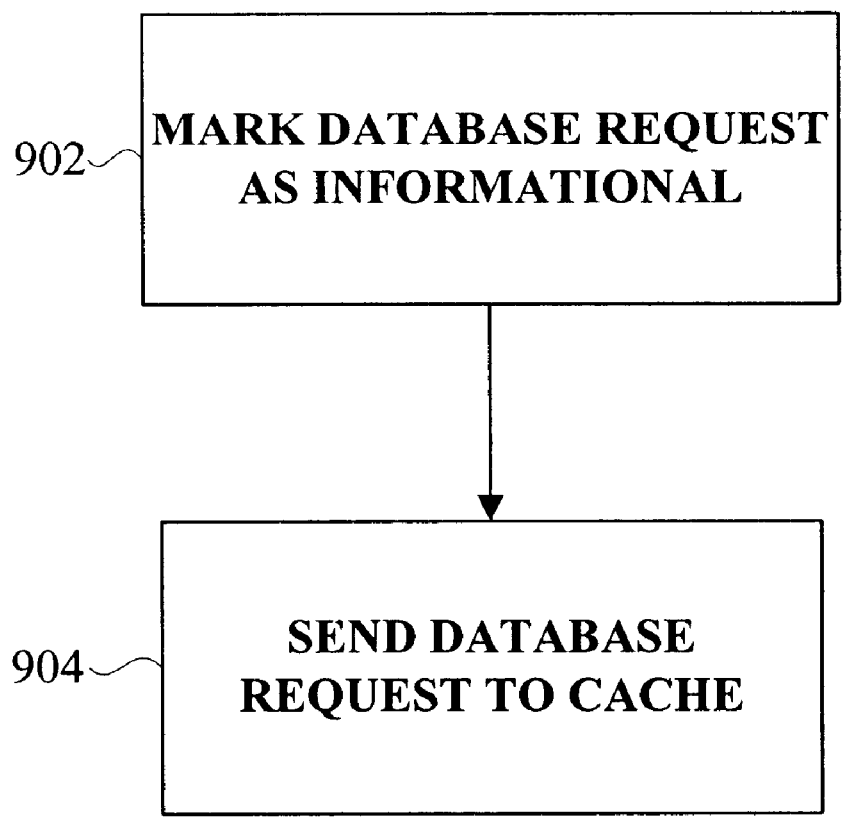
FIG. 9 is a flowchart that describes routing a database request to a cache in greater detail according to an example embodiment of the present invention.

FIG. 9 is a flowchart that describes operation 408 in greater detail according to an example embodiment of the present invention. As described above, informational requests are preferably routed to cache 106 for processing (as determined in operation 404). In operation 902, the database request is marked as informational so that the request may be more easily routed through subsequent operations. In operation 904, cache driver 112 establishes a connection with cache 106 and sends the database request to cache 106 for processing. Any remaining request processing duties are preferably performed by cache 106.

Data Replication Component

Figure 10:
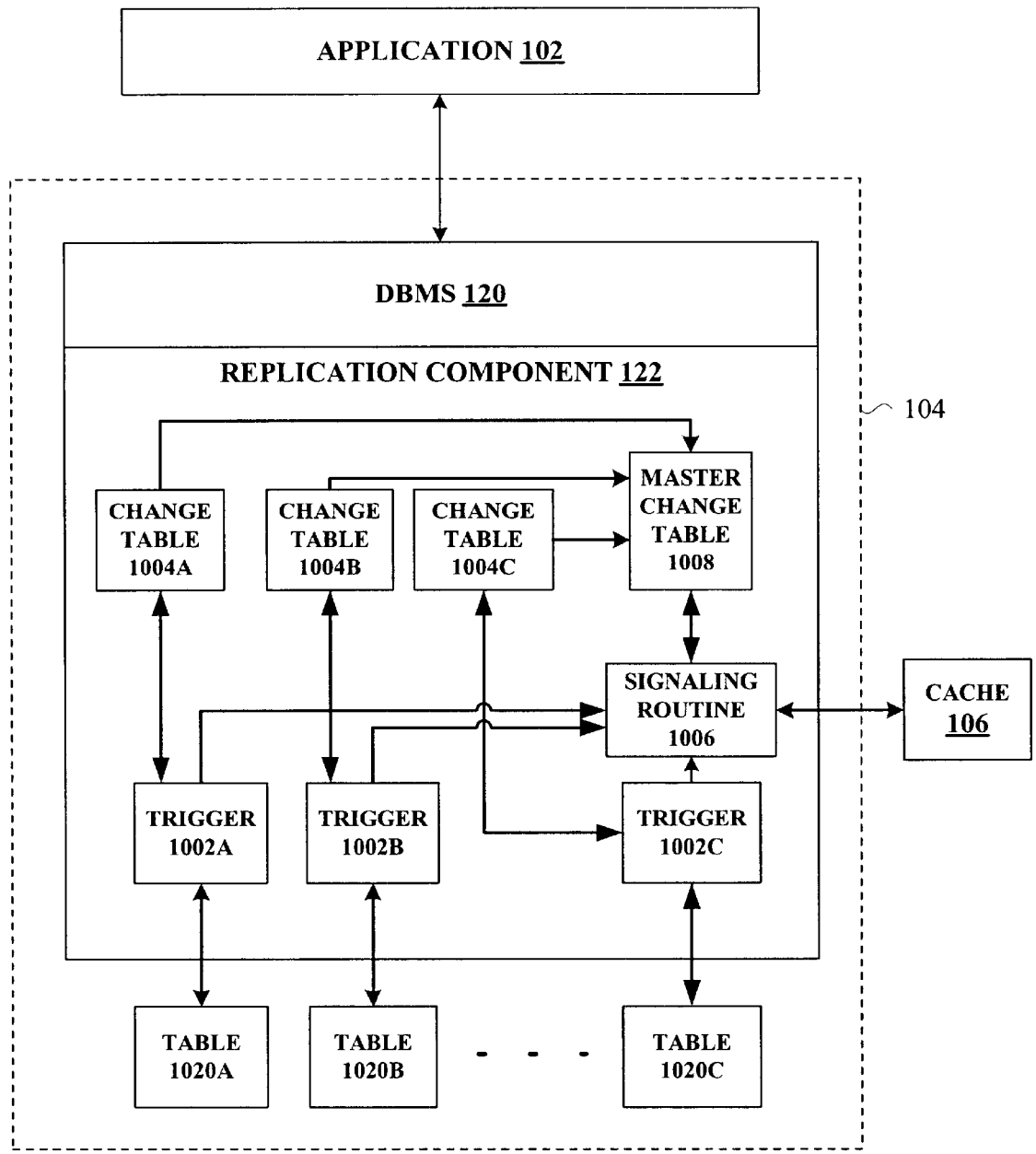
FIG. 10 depicts a replication component in greater detail according to an example embodiment of the present invention.

Returning to FIG. 1, database 104 preferably includes replication component 122 that is responsible for detecting changes that occur in the information stored in database 104 and for propagating those changes to caches 106. FIG. 10 depicts replication component 122 in greater detail according to an example embodiment of the present invention. Replication component 122 includes one or more triggers 1002 (shown as 1002A through 1002C), a change table 1004 (shown as 1004A through 1004C) associated with each trigger 1002, a signaling routine 1006, a master change table 1008. Each trigger 1002 is associated with a database table 1020 (shown as 1020A through 1020C). Database table 1020 represents a table of relational data stored in database 104.

Trigger 1002 represents a program in the native database execution environment which is executed when a change occurs on the associated table 1020. Trigger 1002 has access to the old and new values of each record or set of records that were updated in table 1020. In an example embodiment, a different trigger 1020 is installed for each table 1020 that is selected for caching. Many database environments support multiple triggers per table so that the addition of trigger 1002 need not interfere with existing application triggers.

According to an example embodiment, each change table 1004 is associated with one of the trigger/table pairs. Change table 1004 stores information about each change that has occurred in the associated table 1020, as detected by trigger 1002. Master change table 1008 holds information about the update status of those tables 1020 that have been selected for caching.

As will be clear to those skilled in the art, various other configurations of change tables could be used to similar effect. For example, according to a first alternative embodiment, the separate change tables 1004 are eliminated in favor of a single master change table that is updated by all of the triggers. However, where the number of triggers becomes large, contention between the triggers to update the master change table can result in some performance degradation. According to a second alternative embodiment, master change table 1008 is eliminated and the separate change tables 1004 retained. In this alternative embodiment, signaling routine 1006 queries each change table 1004 to assemble the information that is preferably stored in master change table 1008.

Signaling routine 1006 signals cache 106 that an update has occurred in response to receiving an appropriate signal from trigger 1002. Signaling routine 1006 is preferably implemented as an external routine. External routines are mechanisms provided by the database vendor for executing external third party code within the native database environment.

Figure 11:
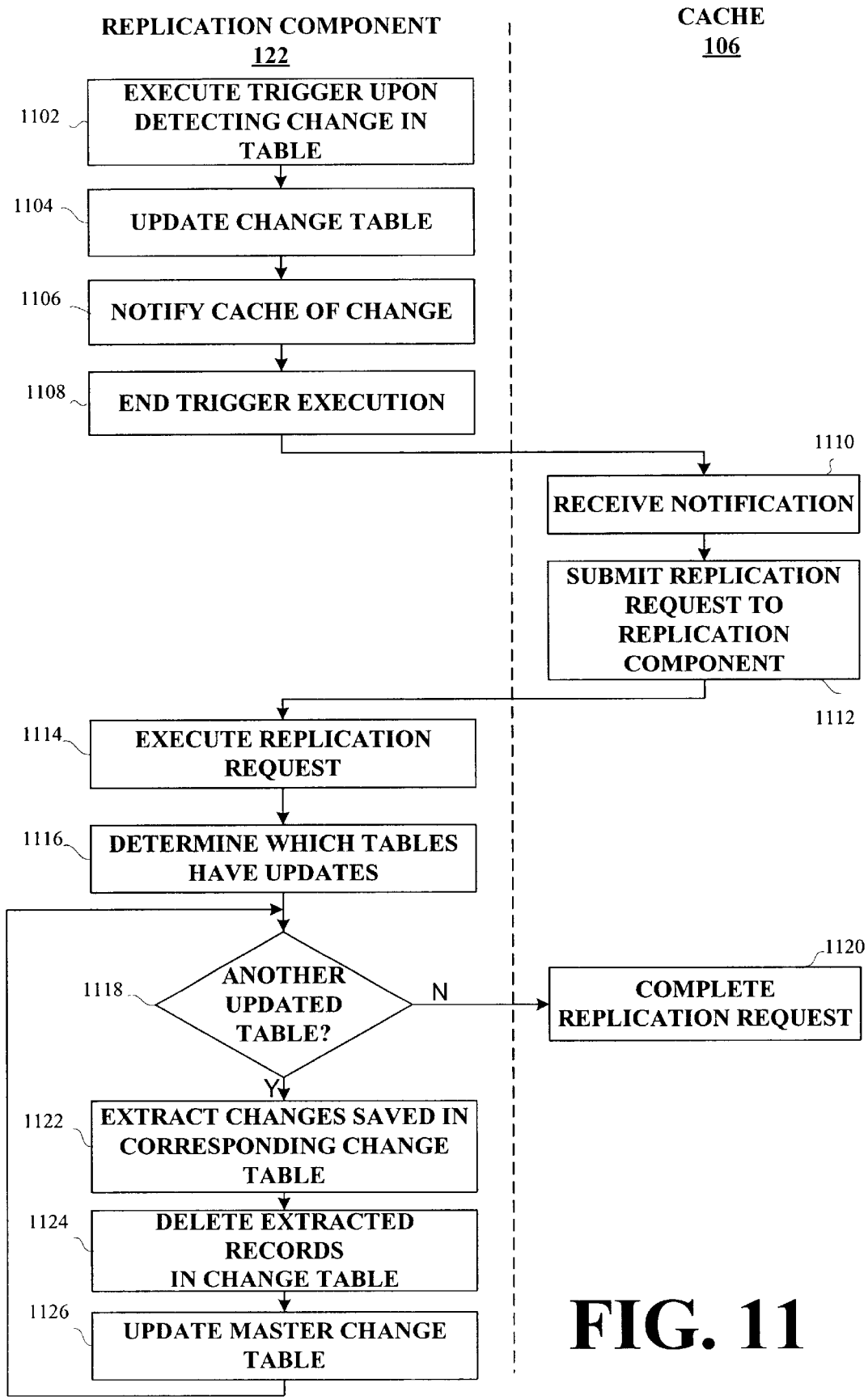
FIG. 11 is a flowchart that describes the operation of a replication component according to an example embodiment of the present invention.

FIG. 11 is a flowchart that describes the operation of replication component 122 according to an example embodiment of the present invention. In operation 1102, one of the triggers 1002 is executed upon detecting a change operation being performed on associated table 1020. In the example SQL embodiment, operations which could produce a change in table 1020 are generally in the form of an SQL INSERT, UPDATE, or DELETE command.

In operation 1104, trigger 1002 updates change table 1004 by storing the old record value and the new record value in change table 1004. There may be more than one row associated with a change, in which case each record's old and new value are preferably stored in change table 1004.

In operation 1106, trigger 1002 calls signaling routine 1006 to notify cache 106 that a change has occurred. According to an alternative embodiment, signaling routine 1006 may also provide additional information about the fields involved in the change and the change data itself. Cache 106 can use this additional information to determine whether the database information currently stored within cache 106 is affected by the changes. Cache 106 can avoid querying database 104 altogether if it is determined that cache 106 is unaffected by the changes. In operation 1108, trigger 1002 ceases execution.

In operation 1110, cache 106 receives notification from signaling routine 1006. In response to this notification, cache 106 submits a replication request to replication component 122 in operation 1112. The replication request will cause replication component 122 to gather all changes that have been stored since the last replication request. The replication request is preferably submitted at the highest isolation level (serializable) to ensure that it executes in isolation of other transactions and therefore captures only completely committed changes. In operation 1114, replication component 122 executes the replication request received from cache 106.

According to an example embodiment of the present invention, signaling routine 1006 is thereby called at the appropriate time to signal cache 106 that a change has occurred, with the result being that the replication request generated in response to the signal is assured of executing after the current transaction has completed. This is because the replication request must wait for all pending transactions (including the signaling transaction) to complete. Signaling in this manner obviates the need for cache 106 to perform a polling operation to detect possible changes. However, according to an alternative embodiment of the present invention, cache 106 can perform a polling operation to periodically check for changes in those tables 1020 that are also stored in cache 106.

In operation 1116, master replication table 1008 is checked to determine which tables 1020 have updates since the last replication request. If it is determined in operation 1118 that a table has been updated, then in operation 1122 the corresponding change table 1004 is queried to retrieve the changes. In operation 1124, the changes retrieved from change table 1004 in operation 1122 are then deleted from change table 1004, or alternatively, the changes are marked as having been read. In operation 1126, master change table 1008 is updated to show that the current table's changes have been read.

The process described by operations 1122 through 1126 continues until each changed table has been queried. Once all the change data has been gathered, in operation 1120 cache 106 updates the appropriate tables stored in cache 106 according to the gathered change data.

Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A method for processing database requests, comprising:
   receiving a database request, the database request including a transaction isolation level;
   determining whether the database request is informational or transactional;
   determining whether the transaction isolation level of the database request is greater than an isolation threshold;
   routing the database request to a device having a cache if the database request is informational or if the transaction isolation level is not greater than the isolation threshold; and
   routing the database request to the database, without routing the database request through the device having the cache, if the database request is transactional, or if the transaction isolation level is greater than the isolation threshold.

2. A method for processing database requests, comprising:
   receiving a database request, the database request including a concurrency setting;
   determining whether the database request is informational or transactional;
   determining whether the concurrency setting of the database request is less than a concurrency threshold;
   routing the database request to a device having a cache if the database request is informational or if the concurrency setting is not less than the concurrency threshold; and
   routing the database request to the database, without routing the database request through the device having the cache, if the database request is transactional, or if the concurrency setting is less than the concurrency threshold.

3. Computer executable software code, comprising:
   code to receive a database request, the database request including a transaction isolation level;
   code to determine whether the database request is informational or transactional;
   code to determine whether the transaction isolation level of the database request is greater than an isolation threshold;
   code to route the database request to a device having a cache if the database request is informational or if the transaction isolation level is not greater than the isolation threshold; and
   code to route the database request to the database, without routing the database request through the device having the cache, if the database request is transactional, or if the transaction isolation level is greater than the isolation threshold.

4. Computer executable software code, comprising:
   code to receive a database request, the database request including a concurrency setting;
   code to determine whether the database request is informational or transactional;
   code to determine whether the concurrency setting of the database request is less than a concurrency threshold;
   code to route the database request to a device having a cache if the database request is informational or if the concurrency setting is not less than the concurrency threshold; and
   code to route the database request to the database, without routing the database request through the device having the cache, if the database request is transactional, or if the concurrency setting is less than the concurrency threshold.

* * * * *